(12) United States Patent
Mathis

(10) Patent No.: US 9,829,298 B2
(45) Date of Patent: Nov. 28, 2017

(54) OPTICAL READOUT DEVICE TO PROVIDE VISUAL INFORMATION

(71) Applicant: PI TAPE CORPORATION, Escondido, CA (US)

(72) Inventor: Jerry Mathis, San Marcos, CA (US)

(73) Assignee: PI TAPE TEXAS, LLC, Tyler, TX (US)

( * ) Notice: Subject to any disclaimer, the term of this patent is extended or adjusted under 35 U.S.C. 154(b) by 173 days.

(21) Appl. No.: 14/839,775

(22) Filed: Aug. 28, 2015

(65) Prior Publication Data

US 2015/0369579 A1 Dec. 24, 2015

Related U.S. Application Data

(63) Continuation-in-part of application No. 13/168,852, filed on Jun. 24, 2011.

(51) Int. Cl.
*G01B 3/10* (2006.01)
*G01B 5/02* (2006.01)
*G01B 5/08* (2006.01)

(52) U.S. Cl.
CPC ......... *G01B 3/1061* (2013.01); *G01B 3/1082* (2013.01); *G01B 5/025* (2013.01); *G01B 5/08* (2013.01); *G01B 2003/1069* (2013.01)

(58) Field of Classification Search
CPC .......... G01B 2003/1069; G01B 3/1061; G01B 3/1082; G01B 5/025; G01B 5/08
USPC .................. 33/701, 706, 707, 735, 488, 773
See application file for complete search history.

(56) References Cited

U.S. PATENT DOCUMENTS

| | | | | | |
|---|---|---|---|---|---|
| 4,473,949 | A | * | 10/1984 | Schechtman | G01B 7/02 33/512 |
| 4,483,077 | A | * | 11/1984 | Matsumoto | G01B 3/02 33/707 |
| 4,611,402 | A | * | 9/1986 | Yamamoto | G01B 3/1061 33/762 |
| 5,027,526 | A | * | 7/1991 | Crane | G01B 3/1061 33/755 |
| 5,142,793 | A | * | 9/1992 | Crane | G01B 3/1061 33/755 |
| 5,406,715 | A | * | 4/1995 | Koizumi | G01B 3/1002 33/512 |
| 5,825,307 | A | | 10/1998 | Titus et al. | |
| 6,388,733 | B1 | | 5/2002 | Hayashi | |
| 6,481,115 | B1 | * | 11/2002 | Henshaw | G01D 5/34738 33/1 N |
| 6,640,460 | B1 | * | 11/2003 | Nabarro | A41C 5/00 33/512 |

(Continued)

OTHER PUBLICATIONS

McMaster-Carr. Catalog 116. (cover and p. 2232).

(Continued)

*Primary Examiner* — Yaritza Guadalupe-McCall
(74) *Attorney, Agent, or Firm* — The Maxham Firm

(57) ABSTRACT

An optical readout device for providing visual circumference and diameter readings of an object being measured by a linear tape. The tail end of the tape passes by a reader element in a digital device which is equipped electronically with the pi conversion factor to provide selective readings of diameter in English and metric units, as well as circumference readings. The device can be employed for external (outside) and internal (inside) measurements.

19 Claims, 4 Drawing Sheets

(56) References Cited

U.S. PATENT DOCUMENTS

| | | | | |
|---|---|---|---|---|
| 7,146,743 B2* | 12/2006 | Oura | ............ | A61B 5/107 |
| | | | | 33/555.4 |
| 7,216,441 B2* | 5/2007 | Batora | ............ | G01B 3/28 |
| | | | | 33/613 |
| 8,356,419 B2* | 1/2013 | Lord | ............ | G01B 3/11 |
| | | | | 33/756 |
| 2003/0126752 A1* | 7/2003 | Brandon | ............ | G01B 3/1082 |
| | | | | 33/494 |
| 2006/0107545 A1* | 5/2006 | Boge | ............ | B23Q 17/22 |
| | | | | 33/707 |
| 2010/0275456 A1* | 11/2010 | Lord | ............ | G01B 3/11 |
| | | | | 33/706 |
| 2012/0330607 A1* | 12/2012 | Mathis | ............ | G01B 3/1061 |
| | | | | 702/157 |
| 2013/0269198 A1* | 10/2013 | Sivec | ............ | G01D 5/34753 |
| | | | | 33/708 |
| 2014/0101948 A1* | 4/2014 | Lee | ............ | G01B 3/1041 |
| | | | | 33/2 R |
| 2014/0250708 A1* | 9/2014 | Bauer | ............ | G01B 3/1061 |
| | | | | 33/760 |
| 2015/0369579 A1* | 12/2015 | Mathis | ............ | G01B 3/1082 |
| | | | | 33/701 |

OTHER PUBLICATIONS

Pi Tape Corporation. Catalog 2004B (4 pages) (Jan. 15, 2004).
Pi Tape Corporation, Price List, Jan. 1991 (2 pages).
Zerfas, Alfred J., "Insertion Tape: A New Circumference Tape for Use in Nutritional Assessment", The American Journal of Clinical Nutrition 28: Jul. 1975 (pp. 782-787).

* cited by examiner

OPTICAL READOUT DEVICE TO PROVIDE VISUAL INFORMATION

FIELD OF INVENTION

This apparatus, as evidenced by the embodiments described and shown herein, relates generally to an optical digital device having a visual indication showing the position of an object pursuant to a reader element sensing that object.

BACKGROUND OF THE INVENTION

Optical readout devices have been coupled with any number of input sources. Such sources include direct inputs from position sensors, or indirect inputs from computational circuitry or algorithms which perform functions from one or more inputs. One example might be a digital conversion from an initial analog input or inputs.

Of particular interest are optical devices which apply an algorithm or a constant conversion factor to an initial input or inputs. For example, a linear input can be converted to diameter or circumference by application of the pi conversion factor, 3.14159 and on to as many decimal places as necessary, as is well known.

As an example, there are a myriad of uses for linear tapes which can be formed into a circle around the outside or the inside of a circular object to provide readings for circumference or diameter. A pi conversion can be incorporated into a vernier device with permanent markings on the end of the tape that cooperatively aligns with the vernier device to provide visual readings of diameter. Of course, length (circumference) markings can be read directly with the tape in place on or in the object being measured. An example is shown in PI TAPE Precision Periphery Tapes Direct Diameter Reading (January 1991).

It is well known that vernier readings, however precise, are still approximations at the very point of precision. Not only is there some element of interpolation, the number or distance read depends on the eyesight and care of the user, and possibly on the amount of tension applied to the two elements of the vernier device.

It is known that digital tape measures where a conversion element may be either capacitive, magnetic, or photoelectric, is used to determine the amount of movement or position of a tape and generate a signal corresponding to that amount of movement of the tape, exist in the marketplace today. There are many different digital devices used with tapes that produce this effect for linear measurement applications as demonstrated by U.S. Pat. Nos. 4,611,402 and 8,356,419. It is also known that non-electronic, non-digital insertion tape techniques can be used to make circumference and diameter measurements with a simple window reading, or a vernier reading, also visually in a window arrangement, as demonstrated by Zerfis, Am. J. Clin. Nutr. 28; 782-787 (1975).

As suggested above, in all measurement tapes there exists the problem of reading or interpreting the hash marks on the tape to get the final measurement. In linear tapes this can be very difficult and can lead to measurement errors. In insertion tapes for radial measurements this problem is an order of magnitude larger where multiple marks must be read with an understanding of the relationship between the hash marks for the user to calculate the final measurement.

Digital tape readers solve the problem of reading hash marks to convert measurements to a known value. To date there have been many that do this for linear applications.

SUMMARY OF EMBODIMENTS OF THE INVENTION

Embodiments of the present invention removes any imprecision that, could result from user error and interpolation of the vernier apparatus by providing precise optical readings of circumference and diameter, converted to digital format as desired.

A tape is formed with a machine readable side commencing from near the tail end and extending over a portion, of the length of the tape toward the head end. Spaced from but generally adjacent the head end of the tape is an optical readout, device coupled with a reader by which the position of the machine readable tail end passes as the tape is fitted to the surface (external or internal) of the object being measured.

The optical readout device is coupled with appropriate electronics which convert the position readings from the tape to circumference and diameter, in either metric or English units, and provides a precise visual digital reading of the desired measurement in the desired units.

The head end of the tape may be formed with an opening through which the tail end of the tape passes as it slides past the reader. The distances or positions on the machine readable portion of the tape are converted by the electronics to the optical digital readings desired.

BRIEF DESCRIPTION OF THE DRAWING

The purposes, features, and advantages of the disclosed device will be more readily perceived from the following detailed description, when read in conjunction with the accompanying drawing, wherein.

DETAILED DESCRIPTION OF EMBODIMENTS OF THE INVENTION

Figure 1:
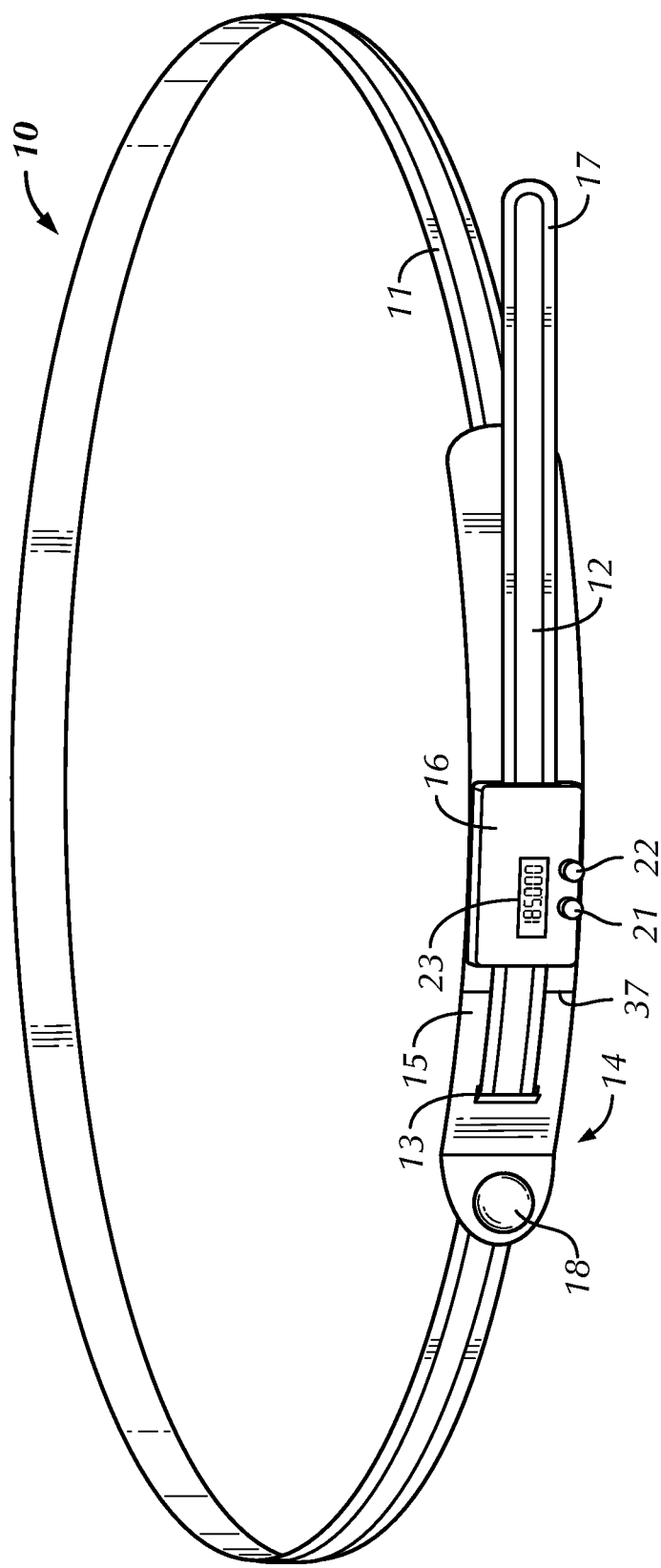
FIG. 1 is the perspective view of an optical digital readout and linear measurement device according to one embodiment of the invention.
Figure 2:
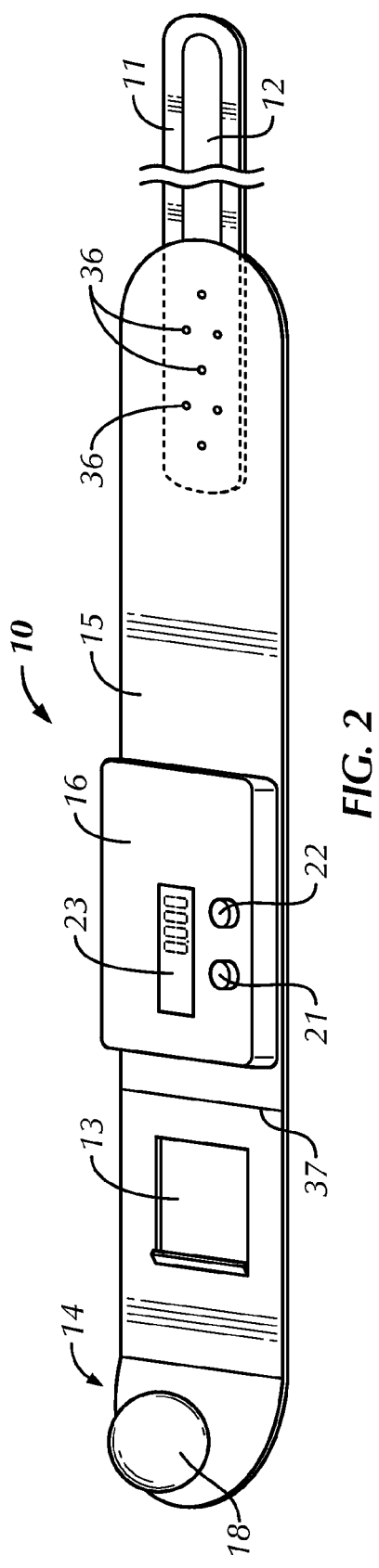
FIG. 2 is an enlarged top or front isometric view of a portion of the FIG. 1 embodiment.

With reference now to the drawing, and more particularly to FIGS. 1 and 2 thereof, there is shown optical, digital device 16 as part of measurement device 10, which includes elongated tape 11 having a machine readable surface 12. Surface 12 may have magnetic, optical, or any other machine readable material thereon which is programmed in increments. Examples of the increment of spacing are 0.01 millimeter, or 0.0005 inch. Of course finer or courser spacings may be employed. It is anticipated that tolerances will range from 0.13 millimeter and 0.005 inch for one level of precision, to high precision tolerances of 0.03 millimeter and 0.001 inch.

It should be understood that available electronic readers, whether magnetic, optical, or other types, have the ability to read leading and trailing edges of markings to achieve even higher precisions than what the recorded, or programmed increments would directly supply.

Tape 11 may include mounting element or plate 15 connected to one end, the head end, of the tape. Tail end 17 of the tape passes through or under optical readout device 16 at the head end of the tape. Handle or knob 18, as well as opening or slot 13, may optionally be provided for the user's convenience in handling the measurement device. In actuality, device 16 may be provided with a back which forms a slot through which end 17 of the tape can pass. Plate 15 would not be necessary at all in a minimal version of the apparatus. Plate 15 would, in such instance, function as the back of device 16.

Mounted to plate 15 is digital device 16 which is preferably internally equipped with a computation means which includes the pi formula or pi conversion factor (3.14159 . . . ) for converting lengths to diameters. Device 16 has a rearward facing conventional magnetic or optical reader element (sensor 41 in FIG. 5) coupled internally to relatively simple electronic circuitry in the digital device. Tail end 17 of tape 11 passes over plate 15 and under the digital device so that machine readable surface 12 faces and passes by the reader element in device 16 at a conventional close distance to enable the surface increments to be sensed by the reader element. Alternatively, digital device 16 may be formed with a slot through which the tape passes, but with the same orientation of surface 12 passing by the reader element.

Figure 5:
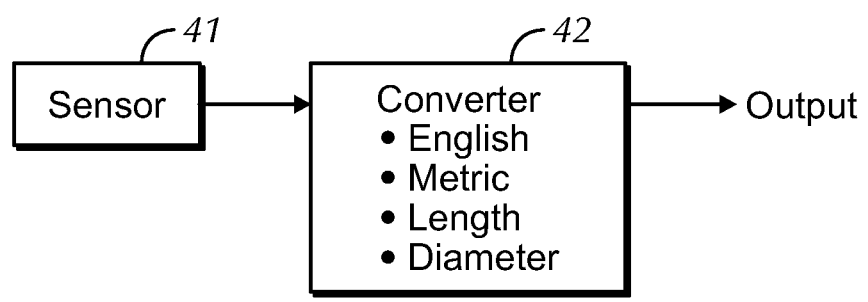
FIG. 5 is a schematic representation of the measurement device converter of FIG. 1.

Devices which provide a digital readout of linear measurements can be obtained from Master-Carr Supply Company in Santa Fe Springs, Calif. An example in the Master-Carr Catalog 116 is the Mitutoyo Electronic Scales. A linear readout device of the type here identified, can be programmed as shown in FIG. 5. The direct reading of change of position of the tape is provided by sensor 41 and applied to converter 42. As will be described herein, a button is depressed to show a readout, selectively, of length in English or metric units, or diameter in English or metric units. Converter 42 is programmed with the pi formula or conversion data, to show the selected quantity. A person of ordinary skill in this field can easily provide such a converter with selector buttons.

When the measurement device described herein is to be employed to measure the circumference or the diameter of an object, tape 11 is applied loosely to the surface of the object, with tail 17 passing by the sensor in digital device 16 so that the machine readable surface 12 is in reading position with respect to the rearward facing reader element in device 16. For initializing purposes, a setup line on plate 15 is aligned with a setup line on the tape, as will be discussed in greater detail with respect to FIG. 3. Optionally, plate 15 may be formed with slot 13 through which end 17 of tape 11 is fed, to facilitate its positioning to pass by the reader in device 16. If a plate 15 is not usual, the edge of device 16 would be employed as the setup line.

Digital device 16 is programmed to perform as now described. After setup has been accomplished, tape 11 is pulled to a desired tension (nominally about five pounds for external measurements) so that the tape is snugly against the external surface of the object being measured. The reader element effectively counts the number of increments on tape surface 12 that pass by after initialization and converts that length change to selected readings in digital readout window 23.

To read the circumference and diameter of the object, left button 21 may be depressed a set amount of times. For example, the digital unit may be programmed so that a single depression of button 21 shows the circumference of the object in inches; two depressions may show the diameter of the object in inches; three depressions can show the circumference of the object in metric units; and four depressions of button 21 may show metric diameter of the object. Of course, unit 16 can be programmed to react to any number of depressions to obtain any one of the four possible visual outputs. The readings may be also, or optionally, connected or transmitted to an external device, such as a monitor screen or any other electronic or visual display device. Further, the outputs of the reader element may be connected or transmitted to an external computation means which incorporates the pi formula and provides the selected diameter and circumference readings.

At the conclusion of the reading sequence, the tape may be relaxed and right button 22 is held, depressed until the readings in window 23 disappear and device 16 is turned off.

Figure 3:
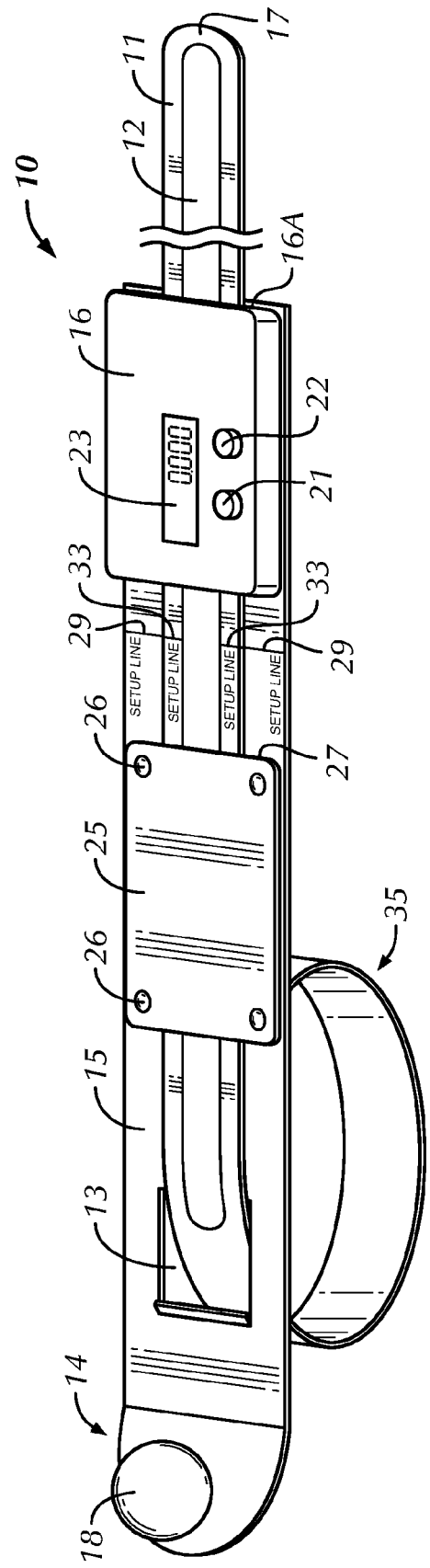
FIG. 3 is an enlarged top or front isometric view of a second embodiment.

With reference now to FIG. 3, the initial setup and operation of an alternative embodiment of the measurement device will be described. The initial setup and operation of the FIGS. 1 and 2 embodiments follows essentially the same procedure.

Plate 15 is optionally constructed with handle end 14 having knob 18, spaced from opening 13. Opening or slot 13 is not necessary but it may be provided for convenience in aligning the free end (17) of the tape for entry into position by the reader in device 16. Guide plate 25 is secured on the outside surface of plate 15 by any suitable means such as rivets 26. Stand offs, such as one or more washers, may be employed to provide gap 27 through which tape 11 can pass. The head end of tape 11 may be secured to plate 15 by any suitable means. The guide plate is optionally provided in this embodiment to assist in keeping the tape from bowing outward due to the relatively tight circle (35) that is formed for smaller circumferential measurements.

Between guide plate 25 and digital device 16 appears "setup line" 29, scribed or etched on the outer surface of plate 15.

EXAMPLE 1

As shown in the FIG. 3 embodiment; tail end 17 of tape 11 is passed through opening 13, under guide plate 25 through gap 27, and through groove 16A in the back of digital device 16. For the small diameter embodiment shown in FIG. 3, tape 11 is pulled through until "setup line" 33 on the machine readable outer side of the tape is aligned with setup line 29 on plate 15. For an instrument that is sized for a diameter range of 2 inches to 12 inches, the setup line alignment for the initial positioning process is at a three-inch diameter, which is the nominal size of tape loop 35 in FIG. 3.

When alignment is achieved, right button 22 is depressed and held to turn on device 16 until a line of dashes is displayed in window 23. The tape is then pulled tight around the item to be measured, with about five pounds of tension, in window 23 initially appears one of the readings previously identified. Depressing left button 21 serially changes the readings between inches and metric, circumference and diameter. When the desired measurements have been completed, button 22 is again depressed and held until display 23 goes blank.

When not in use, digital device 16 can be programmed to turn off after any desired period of time, typically about, five minutes. Actual measurement devices are typically constructed and calibrated in 12 inch increments, for example, 12" to 24", 24" to 36", 36" to 48", 48" to 60". The small diameter device can be 0.75" to 2", or 2" to 12". There are no theoretical size limitations, and examples of practical sizes have been set out here.

EXAMPLE 2

The apparatus shown in FIG. 2 operates in the same manner, hut it is structured for measuring larger diameter items, which can be of any practical diameter where precision is desired. In this embodiment, plate 15, if used at all, is much larger and tape 11 can be affixed to it by rivets 36 as shown. Set up line 37 on plate 15 is shown, but the location of the setup line on the tape is not shown in this figure. However, the FIG. 2 embodiment is set up and used in the same way as the FIG. 3 embodiment. Differences relate primarily to the length of the plate, the length of the tape, and the location of the connection of the tape to the plate.

Figure 4:
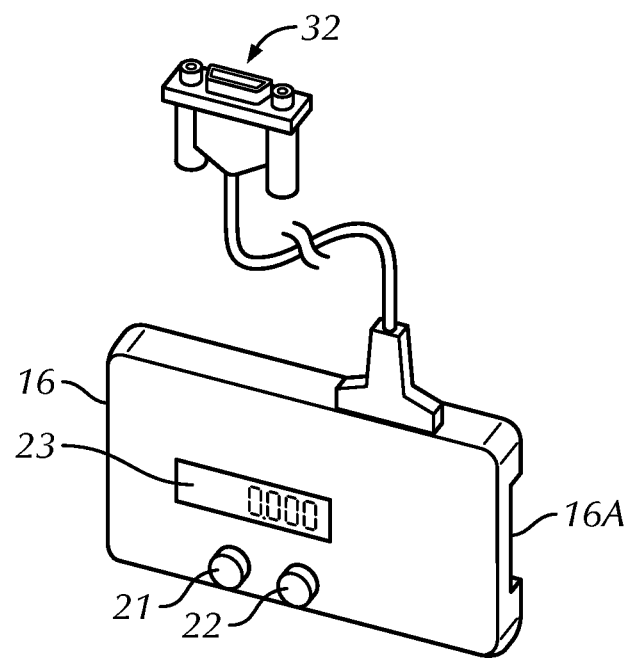
FIG. 4 is a perspective view of the digital readout device of FIG. 1.

Digital device 16 may be battery powered, or could be externally powered. It may have wireless capability, so that an operator can record the readings on a computer, for example. USB port 32 (FIG. 4) is shown for external connections. Alternatively, a computer or other type of device, such as a smart phone or other electronic device, may be directly connected via connector 32, which can be configured as appropriate for any such external connection, Optionally, the functions of buttons 21 and 22 could be reversed from the functions described above.

Figure 6:
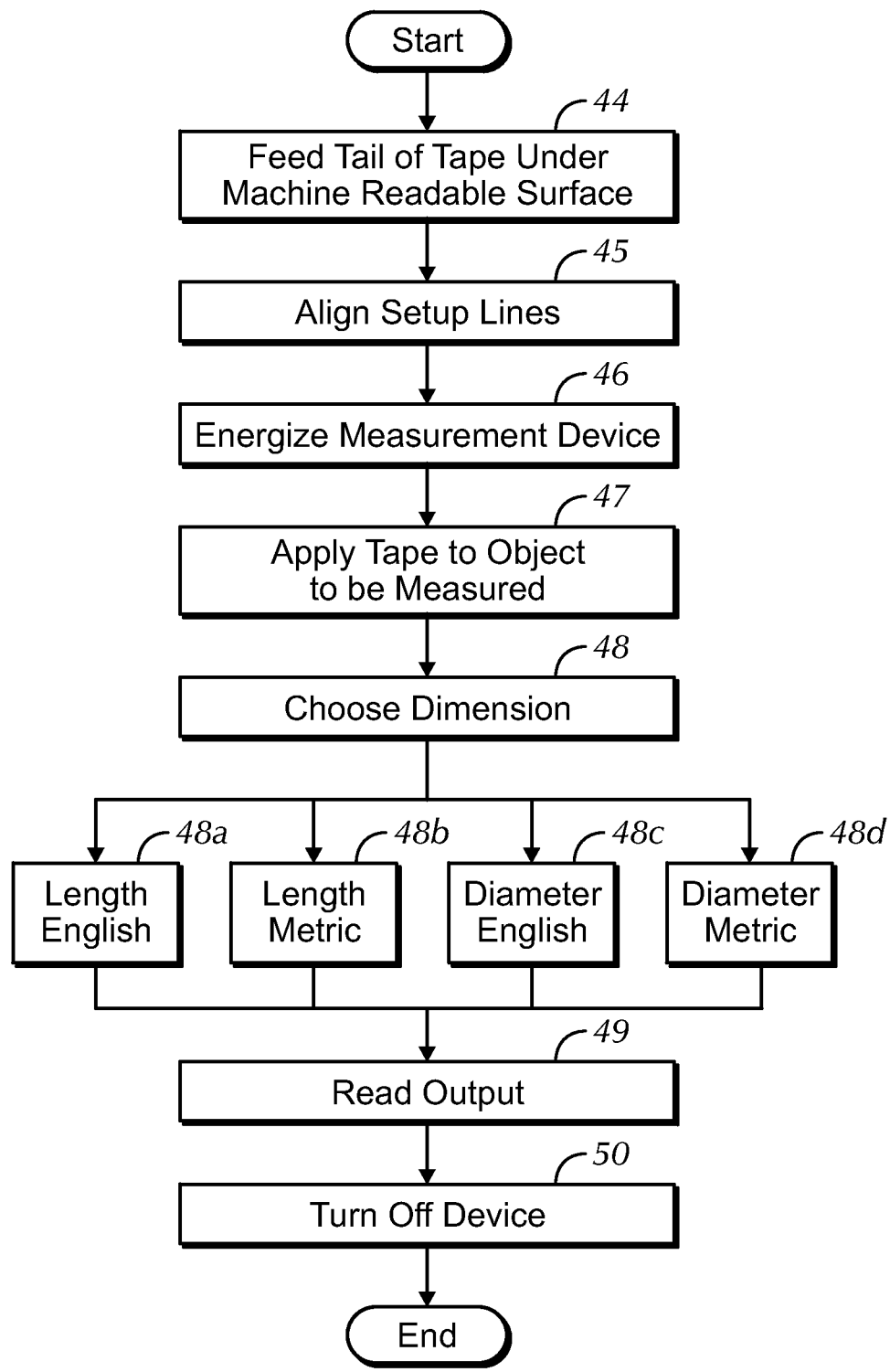
FIG. 6 is a flow chart of the method of use of the FIGS. 1 and 2 embodiment.

FIG. 6 is a flow chart showing the steps described above. When starting a measurement, the tail end of tape 11 is fed under the reader element in device 16 as described in step 44. To zero the device, setup lines 29, 33 are aligned in step 45. Device 16 is then energized (step 46) by depressing button 22 (if that is the button chosen to turn digital device 16 on and off). The tape in that, condition is then applied to the object to be measured in step 47. One of the four readout possibilities 48A, 48B, 48C, 48D is then selected in step 48, the dimension chosen is read in step 49, and the device can then be turned off (50).

It should be noted that the above description relates to using the measurement device to determine external measurements. However, it is also useful for internal circumference and diameter readings.

What is claimed is:

1. An optical device to provide visual readings of circumference and diameter of an object from a linear measurement device, the optical device comprising:
   an optical readout device having a visual indicator area, a reader element, and computation means to provide signals to said optical readout device in relation to signals from said reader element;
   a plate on which said optical readout device is mounted, the reader element on said optical readout device facing and spaced from said plate, said plate having a first end and a second end;
   a bendable elongated tape having one end secured to the first end of said plate and a second end which extends from said plate, said second end having an upper surface and a lower surface and having machine readable increments on at least said upper surface, whereby when said second end of said elongated tape is bent away from said plate and said optical readout device and passed between said reader element and said second end of said plate, said tape thereby achieving a generally circular form, said optical readout device provides visual indication of the outputs selectively representing circumference and diameter of the object from said reader element pursuant to the portion of said second end of said tape which, when bent around a circumferential surface of the object, underlies said reader element.

2. The device of claim 1, wherein said computation means comprises of the pi conversion factor for converting linear positions of said machine readable increments to circumference and diameter outputs in relation to the length of said tape between said optical readout device and said second end in the space between said reader element and said plate.

3. The device of claim 2 wherein tolerances for said device ranges from about 0.03 millimeters to about 0.13 millimeters.

4. The device of claim 1, wherein said machine readable increments commence a predetermined distance from said second end of said tape.

5. The device of claim 4, and further comprising a mounting element at said first end of said tape, said optical readout device being secured to said mounting element, said mounting element being formed with an opening through which said second end of said tape passes to align said machine readable increments thereon with said optical readout device.

6. The device of claim 5, wherein said mounting element has a first setup line adjacent to said optical readout device, said tape having a second setup line at a predetermined location thereon, said first and second setup lines being aligned for initial positioning.

7. The device of claim 5, and further comprising a guide plate on said mounting element intermediate said opening and said optical readout device.

8. The device of claim 7, wherein said tape passes between said guide plate and said mounting element, and passes between said mounting element and said reader element in said optical readout device.

9. The device of claim 5, wherein:
   said opening is adjacent a distal end of said mounting element, the distal end of said mounting element is at an angle upward from a top surface of said mounting element, said device further comprising:
   a handle on said upwardly angled distal end of said mounting element.

10. The device of claim 5, wherein said mounting element is part of said plate to which said first end of said tape is mounted.

11. The device of claim 5, wherein said tape passes between said mounting element and said reader element in said optical readout device.

12. The device of claim 1, wherein said optical readout device is equipped with battery means for power.

13. The device of claim 1, wherein said optical readout device is equipped to be connected to a source of electrical power.

14. The device of claim 1, wherein said machine readable increments are magnetically readable.

15. The device of claim 1, wherein said machine readable increments are optically readable.

16. The device of claim 1, and further comprising means for coupling the digital outputs of said optical readout device to external devices.

17. A method for employing an optical readout device to determine the circumference and diameter of objects by use of a linear measurement device comprising a tape having a surface with non-alpha-numeric machine readable increments thereon, the tape having a first end and a second end, the optical readout device being coupled adjacent to and spaced from and in fixed relationship with the first end of said tape through which optical readout device said machine readable increments pass, an electronic reader element in said optical readout device and computation means coupled to said reader element to selectively provide digital outputs of diameter and circumference in selected measurement units based on linear positions of said machine readable surface in said optical readout device, the method comprising:

initializing the linear measurement device;

energizing the unit and the computation means;

applying the tape closely against the surface of an object with the second end of the tape passed under the reader element; and selecting the readout dimension provided by the measurement device incorporating the pi conversion factor for selectively converting linear positions of the machine readable increments on said second end of said tape to circumference and diameter outputs in selected measurement units.

18. The method of claim 17, comprising the further step of reading the dimension.

19. The method of claim 17, wherein the optical readout device is positioned adjacent the first end of said tape and said machine readable increments commence a predetermined distance from the second end of said tape, and further comprising a mounting element at said first end of said tape, said optical readout device being secured to said mounting element, said mounting element being formed with an opening, the mounting element having a first setup line adjacent to said optical readout device, said tape having a second setup line at a predetermined location thereon, the method further comprising:

inserting the second end of the tape through the opening;

sliding the second end of the tape past the electronic reader element; and aligning the first and second setup lines to thereby initialize the optical readout device and the computation means.

\* \* \* \* \*